United States Patent [19]

Koleas

[11] Patent Number: 5,180,428
[45] Date of Patent: Jan. 19, 1993

[54] IN SITU REJUVENATION OF AGED AND CRACKED ASPHALT PAVEMENT

[76] Inventor: Richard D. Koleas, 1015 S. Freeway, Tucson, Ariz. 85745

[21] Appl. No.: 814,066

[22] Filed: Dec. 24, 1991

Related U.S. Application Data

[63] Continuation of Ser. No. 587,327, Sep. 24, 1990, abandoned.

[51] Int. Cl.$^5$ ............................................. C08L 95/00
[52] U.S. Cl. .................................. 106/277; 106/278; 524/60
[58] Field of Search .................. 106/277; 524/278, 60

[56] References Cited

U.S. PATENT DOCUMENTS

| | | | |
|---|---|---|---|
| 3,808,020 | 4/1974 | Pitchford | 106/277 |
| 3,900,692 | 8/1975 | Rostler | 428/489 |
| 4,021,393 | 5/1977 | McDonald | 106/273 |
| 4,453,980 | 6/1984 | Ward | 106/281 |
| 4,861,377 | 8/1989 | Schilling | 106/277 |

Primary Examiner—David Brunsman
Attorney, Agent, or Firm—Donald D. Mon

[57] ABSTRACT

A liquid modifier for topical application to in-situ aged asphalt pavement, said modifier being an emulsion and consisting essentially of the following components:
a. a predominantly asphaltene asphalt;
b. a predominantly maltene recycling agent;
c. a rubbery polymer or latex selected from the group consisting of styrene-butadiene-styrene, styrene butadiene rubber, neoprene latex, and natural rubber, and combinations of one or more of them;
d. an emulsifier
e. water said emulsion being a flowable liquid so as readily to be poured onto a surface and brushed or wiped onto and into it, and readily to flow into and penetrate small cracks in the pavement, and when the water has evaporated, to form a structural bridge and bond between opposed faces of the cracks, and also to pentrate into the original asphalt pavement through said faces to improve its properties.

4 Claims, No Drawings

IN SITU REJUVENATION OF AGED AND CRACKED ASPHALT PAVEMENT

CROSS REFERENCE TO OTHER APPLICATION

This is a continuation of applicant's U.S. patent application Ser. No. 07/587,327 filed Sep. 24, 1990, which will be abandoned after the filing of this patent application is completed.

FIELD OF THE INVENTION

This invention relates to the in-situ rejuvenation of aged and cracked asphalt pavement.

BACKGROUND OF THE INVENTION

Asphalt used for paving is a surprisingly complex material consisting of a multitude of different types of hydrocarbons. The relative proportion and chemical nature of these constituents depend on the crude source of the asphalt, and to some extent, on the refining method (i.e., whether the asphalt is obtained by distillation or by solvent extraction). It has been convenient to divide the asphalt into different fractions based upon the chemical reactivity. One such method, the Rostler method, divides asphalt into five fractions: asphaltenes; nitrogen bases; first acidiffins; second acidiffins; and paraffins. Another method, the clay gel method, divides the asphalt into asphaltenes, polar compounds, aromatics and saturates.

In turn, the asphalt is blended with a mineral aggregate which, when applied to the ground as an asphalt concrete in sufficient thickness, will harden and for a considerable period of time provide resistance to surface erosion by abrasion and dissolution, to compressive deformation, and to load fracture.

The performance of the asphalt concrete is closely related to the consistency of the asphalt cement used to glue the rocks together. The general measure of the consistency is its viscosity. As the pavement ages, asphalt oxidizes, which causes an increase in its viscosity. At some point the asphalt gets so hard that the asphalt concrete fails.

It is possible to reconstitute an aged asphalt by adding modifiers which replace materials that have been oxidized away, and redisperse certain fractions which have lost their solubility in the other parts of the asphalt. This reconstitution process is often done in situ by grinding the aged asphalt into a suitable range of sizes, and mixing the particles with a modifier which will revitalize the asphalt in the mixture. The rejuvenated mixture is then laid down using standard paving practice and, when it cools down, will function as well as a pavement made with neat asphalt. There are hot and cold processes by which to accomplish such recycling.

The hot process raises the temperature of the re-constituted mixture so as to provide an optimally flowable mixture which can be rolled to a suitable surface and which when cooled sets to a long-wearing pavement.

The cold process relies more on viscosity derived from the properties of the modifier and the lubricating effect of the water. When properly proportioned with a modifier, a suitable pavement can be provided. The cold process has the advantage of a lesser consumption of energy because of the absence or lesser use of heat.

Whatever the situation, the re-use of an aged asphalt to provide a new pavement requires removing the old pavement and processing it. Even in small projects this is a major tonnage operation, which involves either the use of old asphalt paving from a roadway to be recycled, or the use of an old pavement already removed and placed in a storage pit. In every case the process requires removal of the old pavement, then putting it back after it has been rejuvenated. In every situation, the subsurface grading must be attended to, and the recycled asphalt spread over it.

The disadvantages in rejuvenating old asphalt by picking it up, reconstituting it, and then laying it down have not gone unnoticed, and efforts to avert them quite reasonably lead one toward rejuvenating the asphalt pavement in situ if possible. By the phrase "in situ" is meant improving its properties by topical application of a modifier without moving the aged asphalt at all.

Ideally, a modifier for topical application would simply be absorbed into the aged asphalt to restore it to a homogeneous layer. In fact this does not occur. As the asphalt concrete ages, the asphalt in it hardens, and under cyclic loads from thermal sources as well as from traffic, it crazes and cracks. Gaps varying in size from hairline fractures to substantial separations occur throughout the entire body. The mere topical addition of a modifier cannot be expected to penetrate the entire asphalt body, nor to bring the pieces back into a continuous sheet. Conventional modifiers, when used with other means to fill major cracks, can extend the life of a pavement for a considerable of time. Still, the extent of penetration and the stabilization of the separated pavement pieces to resist cyclic loads, has been less than optimum.

It is an object of this invention to provide a modifier intended for topical application to an aged asphalt surface which readily enters cracks and gaps, which makes a substantial penetration into aged asphalt surfaces, and which provides bridge material to bond separated surfaces so they can suitably respond to and resist cyclic loads.

In fact, compositions according to this invention have under the most extreme and widely-varying applications, provided a topical modifier that is readily spread on aged asphalt, preferably but not necessarily brushed in, which after a few hours of rest for penetration and setting restores the aged pavement to general properties that approximate those which one would expect in a pavement only a few years old.

BRIEF DESCRIPTION OF THE INVENTION

A modifier according to this invention is an aqueous emulsion. It comprises an asphalt, a recycling agent, an emulsifier, a polymer, and water.

DETAILED DESCRIPTION OF THE INVENTION

The properties expected of a modifier for rejuvenating aged asphalts in situ include facility of application, adequate shelf life, reasonable penetration into and adherence to aged asphalt, and reasonably rapid setting up to its final condition as part of a rejuvenated asphalt surface.

For these purposes an aqueous emulsion is clearly to be preferred. The modifier is intended to be applied under a wide variety of atmospheric circumstances, and should emit into the atmosphere the least possible amount of compounds which are not regularly present in the atmosphere. In this product, water is the carrier for the other components, and its evaporation into the atmosphere is ineffusive, and suitably rapid.

Because of their inherent nature and sources, asphalt compositions are better defined by their more general properties, rather than by way of identification of the specific compounds that comprise it. For this reason, it is both suitable and also most understandable in the trade for a composition to be defined by its sources rather than by its specific ingredients.

Because the extended life and wear on the existing asphalt has resulted in loss of material, and because the modifier will exist at least in part as a layer subject to wear and aging and is also needed to fill in cracks and gaps, a suitable modifier must include a substantial amount of asphalt.

The presently preferred asphalt is an AC 20, especially those with relatively high asphaltene contents. Asphalts from other crude sources may be used, however.

To this is added a recycling agent. The presently preferred recycling agent is RA-1. This recycling agent consists mainly of material that resembles the maltene (non-asphaltene) fraction of asphalt. Thus it is highly suited for revitalizing the old asphalt. It is preferred that the RA-1 be relatively high in aromatics and polar materials. These same types of oils have found a use as extender oils for oil-extended rubber.

The asphalt and recycling agent are combined as an emulsion. It preferably has a pH between about 2.0 and 2.5. The most effective emulsifier is NP507, which is 70% 50 mol ethoxylated nonyl phenol with the remainder water.

The asphalt, the recycling agent, the emulsifier and water can be combined and mixed to form an aqueous emulsion with a suitable amount of water.

The product may be made by either adding polymer or rubber to the asphalt/recycling agent base stock and preparing an emulsion from the blend of them, or by adding it as a latex to an emulsion of the asphalt/recycling agent. Various types of polymers and rubbers may be used.

The polymer or rubber is the characterizing feature of this invention. The preferred substance is neoprene latex polymer. The presently preferred latex is DuPont Neoprene 115, obtainable from E. I. DuPont de Nemours & Company, Wilmington, Del.

In addition to neoprene latex polymer, examples of other useful polymers or rubber compositions are SBR, SBS, and natural rubber. SBS is a type which will be dissolved in the recycling agent and then emulsified. SBR, Neoprene latex, and natural rubber will be provided as a dispersion, then added to the recycling agent and emulsified.

The remainder of the modifier is water.

The presently-preferred formulation of the modifier, using the above constituents is as follows; by weight:
 a. Asphalt: 35.2%
 b. Recycling agent: 28.8%
 c. Neoprene latex: 2.8%
 d. Emulsifier: 1.0%
 e. Water-remainder in the preferred example: 32.2%.

The ratio of asphalt to the recycling agent is preferably about 5:4. Those are the major constituents to provide a new surface, and to provide means to soften the existing aged asphalt to give good adherence of the modifier and the aged asphalt. This ratio may be between about 1.0 and 1.5 depending on the intended application. The emulsification enables the composition to penetrate very small cracks. The emulsifier results in a composition which for at least several days requires little if any agitation for it to be directly-applicable to the aged surfaces. After that, the emulsion might tend to separate. However, it can be remixed so as to be reconstituted as a useful product.

For its application, the surface to be treated is usually blown clean with a blast of compressed air, and perhaps but not necessarily washed. Thereafter it is directly applied to the surface. It may be brushed into the surface for best results, or wiped into the surface by drawing a wiper across it. After a few hours it will begin to set up, and a layer of sand may be applied to it for better bulk and wearability.

The above formulation has proved to give important new life to aged asphalt surfaces even in extreme conditions, such as in very cold and very hot environments. The latex appears to provide a substantial bond that is resistant to very heavy cyclic vehicular loads, even on pavements that are heavily fragmented.

The above formulation is the best example. There is a range of useful percentages of the components, and additional components could be added for other purposes, provided that they do not forfeit the advantages of those which are described above. In calculating percentages, additional components which provide other functions are to be eliminated.

The total percentage of the asphalt and recycling agent may be in the range between about 58%-70% of the total product, by weight.

The latex may be between about 2%-4% by weight of the total product.

The emulsifier will be added in the amount needed to provide a sensibly stable emulsion. Generally it will be present as about 1% of the total product.

Water will be provided as make-up to constitute a properly emulsified and flowable product.

It should be kept in mind that this product is not to be rolled on as a viscous solid (like hot asphalt layer), but as a liquid that is poured onto the surface and brushed or wiped onto and into it. Variations of the proportions of these ingredients can be made to suit contract requirements.

This invention thereby provides a topically-applicable modifier that has shown extraordinary abilities to extend the life of existing aged asphalt surfaces.

This invention is not to be limited by the embodiments described in the description, which are given by way of example and not of limitation, but only in accordance with the scope of the appended claims.

I claim:

1. A liquid modifier for topical application to in-situ aged asphalt pavement, said modifier being an emulsion and consisting essentially of the following components:
 a. a predominantly asphaltene asphalt;
 b. a predominantly maltene recycling agent;
 c. a rubbery polymer or latex selected from the group consisting of styrene-butadiene-styrene, styrene butadiene rubber, neophrene latex, and natural rubber, and combinations of one or more of them;
 d. an emulsifier
 e. water said emulsion being a flowable liquid so as readily to be poured onto a surface and brushed or wiped onto and into it, and readily to flow into and penetrate small cracks in the pavement, and when the water has evaporated, to form a structural bridge and bond between opposed faces of the cracks, and also to penetrate into the original asphalt pavement through said faces to improve its properties all without lifting or reprocessing the aged asphalt.

2. A liquid modifier according to claim 1 in which the said components are present in approximately the following proportions:
  components a and b combined: between about 58%–70% of the total product, by weight, the ratio of asphaltene asphalt to recycling agent being between about 1.0 and 1.5;
  component c: between about 2% and about 4% of the total product, by weight;
  component d: effective to provide sensible stability of the emulsion;
  component e: as required to constitute a properly emulsified and flowable liquid product.

3. A liquid modifier according to claim 2 in which component a is AC 20 asphalt; in which component b is RA-1, and in which component d is ethoxylated nonyl phenol.

4. A liquid modifier according to claim 3 in which component c is neoprene latex.

* * * * *